United States Patent [19]
Huppke

[11] 3,811,247
[45] May 21, 1974

[54] FOAM TYPE GAS SCRUBBER

[76] Inventor: Glen P. Huppke, Land O' Lakes, Fla.

[22] Filed: May 8, 1972

[21] Appl. No.: 251,440

Related U.S. Application Data

[63] Continuation-in-part of Ser. No. 190,893, Oct. 20, 1971.

[52] U.S. Cl.................. 55/178, 55/233, 261/112
[51] Int. Cl........................................ B01d 19/02
[58] Field of Search ... 55/87, 89, 90, 178, 184–186, 55/190, 228, 233, 235; 261/DIG. 26, 94, 112

[56] References Cited
UNITED STATES PATENTS

| | | | |
|---|---|---|---|
| 3,155,472 | 11/1964 | Huppke | 55/178 |
| 2,870,860 | 1/1959 | Ray | 55/186 |
| 3,413,778 | 12/1968 | Lavery et al. | 55/186 |
| 3,169,841 | 2/1965 | Weis | 55/178 |
| 3,227,429 | 1/1966 | Renzi | 261/112 |
| 3,402,105 | 9/1968 | Sze | 261/112 |

Primary Examiner—Charles N. Hart
Attorney, Agent, or Firm—Richard D. Mason

[57] ABSTRACT

A wet foam type gas scrubber for cleaning industrial gases and the like comprising foam generating means including a chamber having an inlet for gas and an outlet for foam. Grid means is provided in said chamber between said inlet and outlet and extending transverse to the gas flow therebetween for dividing the gas flow into a pluraltiy of separate streams. Said grid means comprises a plurality of elongated strips interconnected to form a plurality of discrete flow passages and the strips have thin, knife-like edges facing into the direction of gas flow for dividing the same into separate streams. Means is included for wetting said grid means with liquid foaming agent to generate a mass of moving, liquid film, foam bubbles enveloping small discrete volumes of said gas therein. Foam breaker means using gravity and centrifugal force is provided to collapse and break down the foam bubbles into liquid and release the cleansed gas therefrom.

10 Claims, 4 Drawing Figures

PATENTED MAY 21 1974 3,811,247
SHEET 2 OF 2
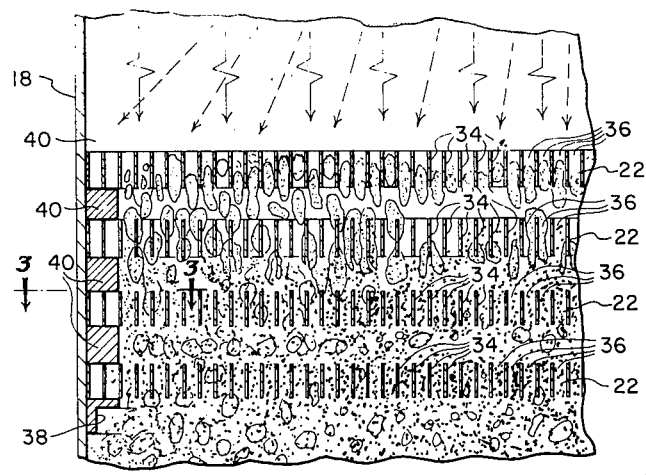
FIG. 2
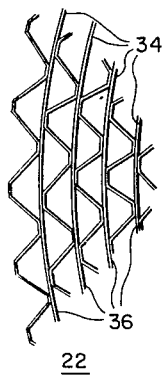
FIG. 3
FIG. 4
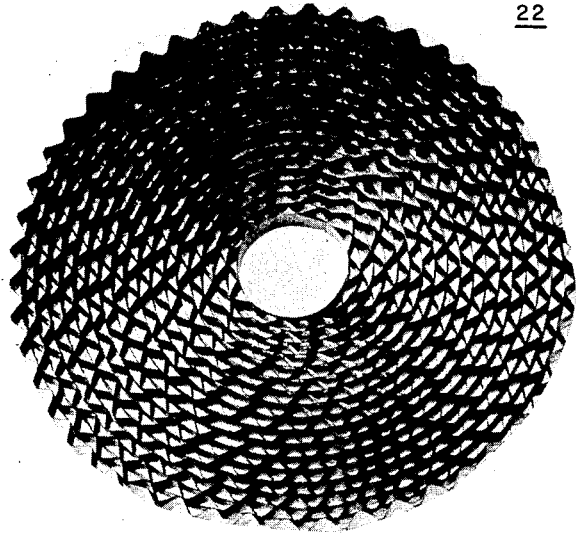

FOAM TYPE GAS SCRUBBER

The present invention is an improvement on the foam scrubber shown and described in the copending U.S. Pat. application Ser. No. 244,890, filed Apr. 21, 1972; this application is a continuation-in-part of the now abandoned U.S. Pat. application Ser. No. 190,893, filed Oct. 20, 1971.

The present invention is directed toward a new and improved foam scrubber wherein a large mass of small size liquid foam bubbles are provided for enveloping and entrapping small discrete volumes of gas. During the period of entrapment or envelopment of the gas in the bubbles, the liquid film which forms the foam bubbles collects the contaminants in the gas by a diffusion and absorption process and the contaminants collected and the liquid are then separated from the gas as the foam bubbles are collapsed. Foam scrubbers employing a large volume or mass of small size foam bubbles offer many advantages over other types of wet gas scrubbing equipment. For example, when the foam bubbles are small in size an extremely large surface area of liquid film is provided per unit volume of gas in order to present a maximum surface area for absorbing the contaminants from the gases. One problem with foam-type gas scrubbers is in maintaining the foam in a stable condition and with a minimum bubble size for a desired soaking period or interval of time so that the contaminants within the gases will have enough time to diffuse and collect in the liquid film making up the foam bubbles. Another problem associated with the former is that when a stable foam is achieved means must be provided for effectively breaking down or collapsing a high volume flow rate of the foam in order to separate the cleansed gas from the contaminated liquid. It is also a problem to efficiently handle a large volume flow rate of foam with equipment and components of relatively small size.

Gas scrubbers of the wet foam-type utilizing a gas entrapment or enclosure principle wherein a plurality of minute or small-size foam bubbles are highly effective in removing small-size contaminant particles from the gas. The foam bubbles envelop and entrap small, discrete volumes of the contaminated gas and it is believed that the small size impurities in the gas act more like molecules than particles of matter and behave more in accordance with Brownian molecular theory than they do as physically discrete particles responding according to the physical laws of inertia and gravity. It is believed that when a large number of small, discrete gas volumes are entrapped within a mass of liquid film bubbles, the presence of a rather large surface area of liquid film per unit gas volume and the absence of buoyant gas flow velocities within each bubble provide for an almost complete collection of the small-size as well as large particle size impurities in the liquid film. The impurities in the gas move like molecules and eventually are transferred into the liquid film in a diffusion process which takes a considerable period of time (called, for example, a soaking period) to insure that all of the contaminants are removed. If the period of soaking is long enough, substantially all of the nongaseous as well as the noxious gases and other impurities are absorbed and diffused into the liquid surface and carried away upon collapse of the bubbles.

In some wet scrubbing installations used in connection with fuel burning equipment wherein coal or other fuels having appreciable amounts of sulphur is burned, there has been difficulty in removing sulphur oxides from the final exhaust or stack gases discharged to the atmosphere. Many prior art wet scrubbers have been unable to successfully remove these objectionable stack gas components, particularly sulphur dioxide, unless the scrubbers are operated at extremely high pressure drops and even then complete success is elusive. One proposed method of treatment is to inject ammonia into the gas or into the scrubbing liquid but this has resulted oftentime in the formation of a visible exhaust plume which is extremely difficult to remove by wet scrubbers of the prior art. The plume is believed to include submicronic particles of ammonium sulphite $[(NH_4)_2 SO_3]$ which particles, although soluble in water to some extent are difficult to remove by conventional wet scrubbers. Other compounds may also be formed by the combination of ammonia and oxides of sulphur and until the present invention no economically feasible method of removal of the plume was available. Moreover, no effective wet scrubbers were available to remove the objectionable material from the gases except by operating the scrubbers at extremely high pressure drops with the attendant disadvantages of high operating costs and maintenance costs.

It is therefore an object of the present invention to provide a new and improved wet, foam-type, gas scrubber.

Another object of the invention is to provide a new and improved method of removing contaminants from gas.

More particularly, it is an object of the present invention to provide a new and improved, highly efficient method of removing contaminants of extremely small average size from industrial gases and the like.

It is another object of the present invention to provide a new and improved foam scrubber which employs a plurality or mass of relatively small-size, liquid foam bubbles which entrap and envelop discrete volumes of the gas and collect the contaminants from the gas in a diffusion process.

Yet another object of the present invention is to provide a new and improved foam scrubber of the character described which is efficient in operation and which is operable at a reasonable cost in terms of energy expended and cleaning efficiency achieved.

Another object of the present invention is to provide a new and improved foam scrubber having a smaller physical size than heretofore possible, yet able to provide an extremely high ratio of liquid film or surface area per unit volume of gas being treated.

Another object of the present invention is to provide a new and improved foam scrubber of the character described having new and improved foam generating means therein.

Another object of the present invention is to provide a new and improved foam scrubber of the character described having new and improved means for handling large volumes of foam and for breaking up or collapsing the same and separating the cleansed gas from the contaminated liquid of the foam.

Another object of the present invention is to provide a new and improved foam scrubber having means for generating a stable foam with a minimum of energy expended and with a minimum of liquid required, yet still providing an extremely high ratio of liquid surface area per unit volume of gas.

Still another object of the present invention is to provide a new and improved method and apparatus for removing contaminants from gas wherein foam bubbles are generated and maintained at a minimum average size in order to provide a maximum ratio of liquid surface area per unit volume of gas being treated.

Still another object of the present invention is to provide a new and improved foam scrubber wherein foam bubbles are created and retained at small size for a selected interval of time or a desired useful time life and are then collapsed with a minimum amount of energy being required for both generating the foam and for collapsing and breaking up the foam bubbles at the end of the soaking time period.

Still another object of the present invention is to provide a new and improved wet foam gas scrubber wherein the gas is soaked in small, discrete, liquid film foam bubbles for a selected soaking period of time, affording opportunity for the contaminant particles to leave the gas and collect in the liquid film.

Yet another object of the present invention is to provide a new and improved foam scrubber of the character described wherein size growth of the foam bubbles is controlled to maintain a small, average bubble size in order to provide maximum surface liquid area exposed to the entrapped gases therein.

Another object of the present invention is to provide a new and improved foam scrubber of the character described wherein a minimum pressure drop or energy requirement is needed between the time of foam generation and foam collapsing to move the gases through the scrubbing process.

Another object of the present invention is to provide a new and improved method of cleaning contaminated gas capable of removing an extremely high percentage of the contaminants in the gas, especially those contaminants having an average size of 1 micron or less, and gaseous contaminants such as oxides of nitrogen and sulphur.

Another object of the present invention is to provide a new and improved method of removing contaminated gas wherein the gas is entrapped in a plurality or mass of small-size liquid film, foam bubbles, which bubbles are subsequently divided to maintain a selected maximum bubble size as the gases are treated in the process.

In accordance with the present invention, a new and improved wet foam type, gas scrubber includes novel foam generator means for forming a mass of small-size liquid foam bubbles for entrapping and enveloping small, discrete volumes of the gas to be cleaned. Means is provided for maintaining the foam bubbles at a controlled maximum size for a selected soaking interval of time in order to permit diffusion of the contaminants from the gas into the liquid film of the foam bubbles. Novel foam breaker means is provided for breaking down and collapsing the foam bubbles after the soaking interval and for separating the liquid from the cleansed gas. The novel foam generator provides a knife edge grid structure for dividing the gas into plural streams for foam bubble formation at a low energy cost in comparison to prior devices and the novel foam breaker provides a highly efficient system for handling a high volume flow rate of foam at low energy cost.

For a better understanding of the invention, reference should be had to the following detailed description taken in conjunction with the drawings, in which:

FIG. 2 is a fragmentary, enlarged, sectional view taken substantially along line 2—2 of FIG. 1 illustrating in somewhat animated form a novel grid structure of the invention and the process of foam generation and bubble-size maintenance in accordance with the features of the present invention;

FIG. 3 is a fragmentary, enlarged, transverse horizontal sectional view taken substantially along lines 3—3 of FIG. 1; and FIG. 4 is a photograph illustrating a component of the novel grid structure used in foam generation and bubble-size maintenance in accordance with the invention.

Figure 1:
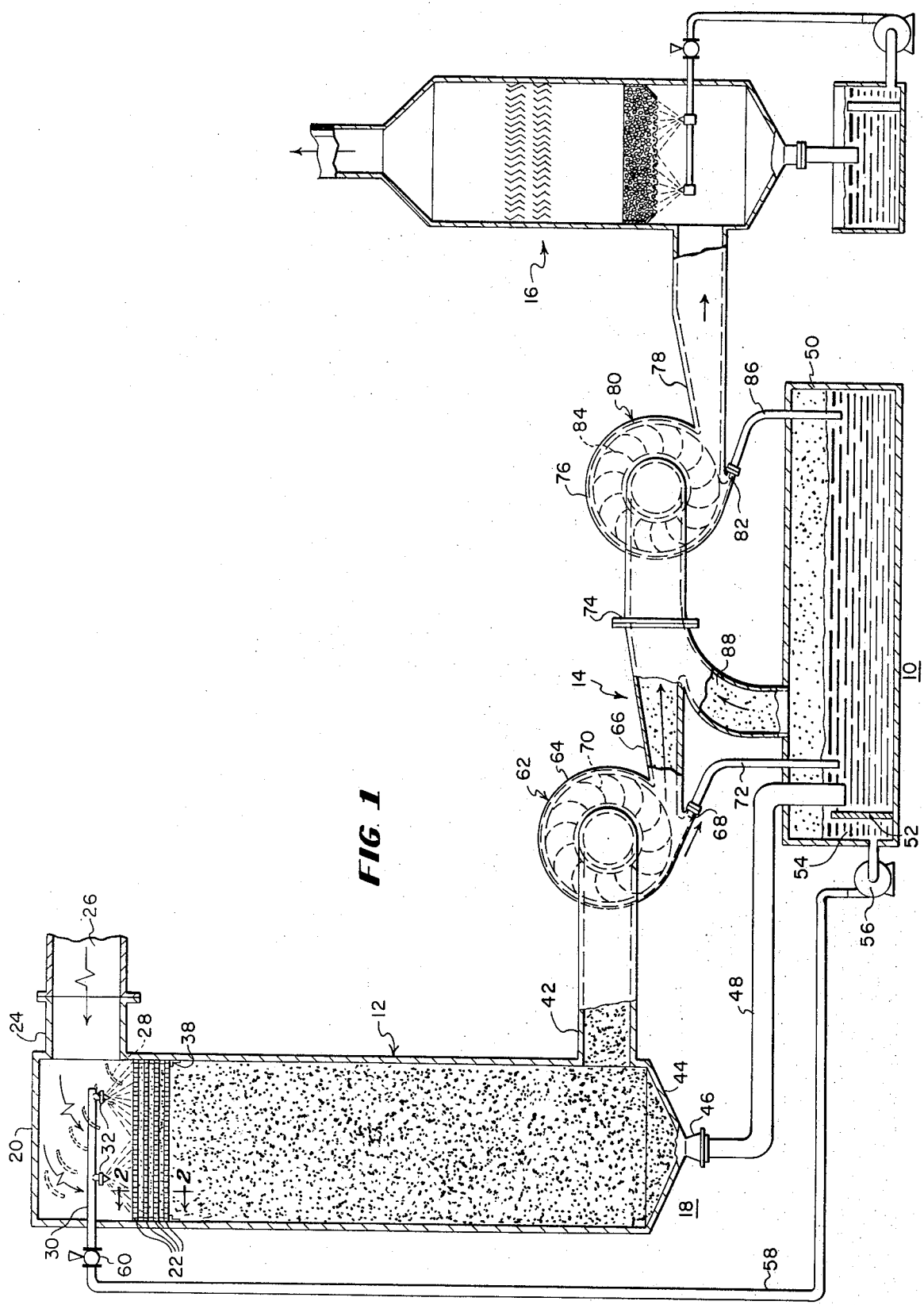
FIG. 1 is a vertical, sectional view of a gas scrubbing system including a new and improved foam scrubber apparatus constructed in accordance with the features of the present invention.

Referring now more particularly to the drawings, therein is illustrated a gas scrubber system utilizing a new and improved wet foam type gas scrubber constructed in accordance with the features of the present invention and referred to generally by the reference numeral 10. The foam scrubber 10 includes a foam generating and gas soaking chamber 12, and a foam collapsing or breaker unit and gas/liquid separator generally indicated by the reference numeral 14. In addition, the system may include a final stage or secondary wet scrubber 16 of the type shown and described in U.S. Pat. No. 3,348,364 or U.S. Pat. No. 3,289,398.

The foam generator and soaking chamber 12 includes an upright housing 18 having vertical sidewalls, a top wall 20, and a plurality of vertically spaced apart, horizontal grid layers 22 extending transversely across the housing adjacent the upper end. Contaminated gas to be cleaned is introduced into the upper end of the housing through an inlet fitting 24 and a supply duct 26 and the gas is directed downwardly toward the grids 22 by a plurality of arcuate turning vanes 28. Liquid foaming agent comprising a mixture of water and detergent or other chemicals which increase the surface tension of the liquid mixture to provide a liquid film, foam bubble forming wetting agent, is introduced into the gas in the upper end of the chamber 18 for foam generation by a supply conduit 30 having a plurality of nozzles 32 to provide for a relatively uniform distribution of the liquid foaming agent as a fine liquid mist or spray onto the upper grid 22 of the stacked array.

As best shown in FIG. 2, the vertically spaced apart grid layers 22 provide for foam formation as the gas passes through the openings which are wetted with liquid foaming agent and a mass of small size foam bubbles are initially generated as the gas passes through the uppermost grid. The grid layer openings divide the gas sharply into a plurality of separate discrete part streams so that small discrete volumes of gas are enveloped or wrapped in liquid film in the form of foam bubbles of small size as the gas exits the lower edge of the grid structure. These foam bubbles are subsequently divided and subdivided by the grid layers below as the liquid film foam bubbles move downward in the chamber 18. Any tendency of the bubbles to expand and enlarge in size is counteracted by the continuous dividing action of the lower grid layer as the foam bubbles move downward. The average bubble size of the foam being generated is thus maintained and kept small in order to provide an extremely high ratio of liquid film surface area per unit volume of gas being handled by the foam scrubber.

It is desirable to provide and maintain an extremely small average bubble size in the mass or column of foam generated at the upper end of the housing 18 and moving downwardly toward the lower end. An average bubble size of approximately 8 mils to 30 mils (.008 inch − .030 inch) is achieved with the new and improved grid structure 22 of the present invention and with an average bubble size of 10 mils, the ratio of liquid surface area per volume of gas entrapped thereby is approximately 8,000 square feet per cubic foot, an extremely large wetting surface for collection of contaminants.

In a prototype scrubber 10, it has been found that a liquid foaming agent comprising a mixture of water and 2 percent "Triton X-100" (a liquid detergent by Rohm & Haas Chemical Company) produces good quality, relatively stable, foam bubbles averaging in size from 8 to 20 mils (.008 inch − .020 inch). Moreover, the foam is not destroyed even when an average foam travel velocity as high as 130 feet per minute through the housing 18 is set up. Increasing the concentration or percentage of liquid foaming chemical in the liquid scrubbing mixture provides better foam which can be maintained in stable conditions at even higher average foam movement velocities up to approximately 200 feet per minute. The higher velocities are obtained at an increased pressure drop in the gas as it moves through the housing 18 and a tendency toward an increase in average bubble size usually results. The pressure loss or energy required to generate the foam and move the foam through the housing increases with the number of grid layers 22 and also increases with a reduction in the size of the openings in the grid. The power required increases with an increase in concentration of liquid foaming agent or detergent in the scrubbing liquid mixture used for making foam and also increases as the rate of scrubbing liquid supplied to produce foam is reduced. Foam densities of approximately 1/2 pound per cubic foot are especially effective in providing high collection efficiencies with minimum water rates and energy requirements. In addition, the wettability of the contaminant particles in the gas and the type of gas being cleaned are significant factors that effect the foam generation.

In accordance with the present invention, the foam scrubber 10 employs a plurality of novel grid structures 22 for producing foam with the desired bubble size and at low cost in terms of power or energy required to push or move the gas through the scrubber. The grid layers 22 are fabricated of a plurality of elongated, thin, metal ribbons interconnected together into an integral honeycomb like structure. The ribbons or strips are formed of stainless steel or other material resistant to corrosion from the gases passing through the scrubber and the honeycomb like structure includes pairs of parallel, spaced apart ribbons 34 interconnected with transverse ribbons or strips 36 secured alternatively thereto by appropriate means such as spot welding and the like.

In the grid layers 22 of the present invention the ribbons comprise stainless steel strips approximately .005 inch thick and about .250 inch wide. The ribbons utilized may vary in thickness from .001 inch to .005 inch and even go as high as .010 inch in thickness where exceptionally high strength grids are required because of high velocities, large unsupported grid areas and other mechanical factors. Moreover, the width of the ribbons 34 and 36 can be varied to provide the needed mechanical strength with a minimum of surface friction as the gas passes therethrough. Ribbons ranging in width from .010 inch to .250 inch or greater are effective to provide a strong grid layer 22 when welded together into the honeycomb like structure.

Because of the thinness of the strips or ribbons 34 and 36 thin, knife-like edges only are presented directly to the incoming gases flowing through the grids 22 and additionally, there is very little flow constriction and resultant velocity and friction increase as the foam bubbles are formed. The grid structures 22 have extremely high ratios of open area in comparison to conventional screens with the same size openings. Moreover, with the honeycomb like grids 22, division and subdivision of the foam bubbles downstream of the uppermost grid by the successive lower grids is more easily attained because of the sharp knife-like edge of the ribbons 34 and 36. A typical wire or strand of a wire screen or mesh is round is cross-section and presents a much blunter edge to the gases than does the thin knife-like edge of the metal ribbons.

In accordance with the illustrated embodiments, shown in the photo of FIG. 4 and in enlarged detail in FIG. 3, the parallel pairs of strips 34 are generated as spirals around a common axis extended longitudinally of the direction of downward gas flow in the chamber 18. The transverse strips 36 are formed in a zig-zag fashion and are alternately secured to opposing faces of the spiral strips by spot welding or the like. The openings provided in this type of grid structure are somewhat trapezoidal in shape as shown and the area of each opening is of course readily controlled by the spacing between the pairs of spiral strips 34 as determined by the length of the legs or zig-zag undulations in the transverse strips. In one prototype grid structure 22 in accordance with the invention the spiral strips 34 are spaced apart approximately .090 inch and the bases of the trapezoidal openings in the grid structure are approximately .250 inch with tops approximately .045 inch. The prototype grids 22 of this opening size produced foam bubbles with an average bubble size of 10 to 20 mils (.010 inch to .020 inch) and the pressure loss through the grids was considerably less than with screen mesh of round strands with a comparable opening size. Moreover, because the width of the ribbons 34 and 36 is parallel of the direction of gas flow and is substantial in comparison to the thickness or knife edge a better film holding surface is provided for making the bubbles than with round wire mesh. In addition, it has been found that as few as four layers of the grids 22 are sufficient to provide stable bubble size at a minimum friction loss in comparison to many more layers of screen mesh being required resulting in much higher friction losses.

As best shown in FIG. 2 the honeycomb like grids 22 are mounted in spaced apart, parallel relation in the upper end portion of the chamber 18 below the nozzles 32. The lowermost grid is supported from the housing walls by means of angles 38 and the grids above the lower one are supported by spacers 40 of the desired thickness to provide the selected spacing between grids, usually approximately the same as the width of the ribbons making up the grids. The spacers are preferably formed of gasket like resilient material and are readily removable so that the grids themselves can be removed for cleaning or replacement.

As illustrated in FIG. 2, the sprayed mixture of foaming chemical and water reaching the upper grid 22 forms a liquid film across the openings and on the wall surfaces of the ribbons and, as the gas flows downward, the liquid film is enveloped or wrapped around small, discrete volumes of the gas to form gas filled foam bubbles much in the same manner that a child makes soap bubbles with soapy liquid by moving a ring through the liquid and then blowing on the liquid film on the ring. The entrapped or enveloped small, discrete volumes of gas in the liquid foam bubbles are subjected to repeated divisions and subdivisions as the foam moves through succeeding lower grid layers 22. The grid layers are randomly oriented in the stack so that the openings are not vertically aligned and thus successive division and subdivision of the foam bubbles is enhanced. The bubbles making up the foam mass are thus continually being divided, subdivided, etc., to maintain a selected maximum average bubble size to insure maximum ratio of liquid film surface area per unit volume of gas.

With an average foam movement velocity of 130 feet per minute through the grids 22 of the opening size as previously set forth a relatively fine foam is produced with an average bubble size of 10 to 20 mils (.010 inch to .020 inch) at a pressure drop of approximately 12 inches of water measured between the upper and lower ends of the chamber 18. A water rate (flow rate of foam producing scrubbing liquid supplied to the generator) was about 60 gallons per thousand cubic feet of gas passing through the system. Small size (less than 1 micron in diameter) magnesium oxide particles produced in an electric furnace were introduced into the gas flow through the scrubber as a test gas and a collection efficiency of 99.5 percent plus on particulates was achieved under the operating conditions set forth. Extremely high collection efficiencies on small-size and difficult-to-collect impurities, such as electric furnace dust, are achieved with the foam scrubber 10 of the present invention at an energy expenditure level per unit volume of gas considerably less than with other scrubbers.

Extremely high collection and absorption efficiencies in the foam scrubber are achieved because of the high ratio of liquid surface exposed to the gas. The gas inside each bubble is stationary with respect to the bubble wall, although the entire mass of foam bubbles is moving through the system and the contaminant particles and molecules are believed to move in random directions until substantially all are in contact with the liquid film. Accordingly, even the smallest, submicronic, contaminant particles in the gas are not buoyed up by a moving gas stream and eventually these particles strike the surrounding liquid film of the bubble walls and are diffused into the liquid and contained therein. The small, average size of the foam bubbles and the ample soaking interval provide an ample opportunity for the contaminated particles to contact the liquid film bubble walls and the particles agglomerate in the liquid and grow larger and heavier. As the foam mass passes downwardly through the subsequent lower grid layers 22 in the housing 18, the foam mass velocity is adjusted to provide ample soaking time for a complete diffusion of the contaminants into the liquid film bubble walls. By the time the foam bubbles reach the lower grid 22, the foam bubble size is relatively stabilized and does not tend to enlarge or shrink to any great extent. During the period of time that elapses between the initial formation of the foam bubbles and the final exit from the lower end of the housing 18, through an outlet duct 42 to the foam breaker 14, the contaminants in the small, discrete volumes of gas entrapped within the foam bubbles are afforded an ample soaking time of sufficient length to enable them to diffuse and collect in the liquid film. Excess scrubbing liquid and the heavier, or thicker liquid droplets which contain agglomerated contaminants drain rapidly downward in the foam mass and collect in a conical sump 44 at the lower end of the housing. The sump is provided with a drain opening at the bottom connected via a fitting 46 and conduit 48 to a settlement chamber or housing 50 of the foam breaker 12. In the settlement chamber the contaminants and sludge material collected from the gas settle to the bottom and are separated from the liquid foaming agent mixture which is drawn off over a baffle 52 into a clear well 54 for recirculation in the system. Scrubbing liquid from the clear well 54 is pumped out of the chamber 50 via a recirculation pump 56 and return line 58 to the conduit 30 for supply to the nozzles 32. A control valve 60 is provided to regulate the flow rate of liquid supplied to the scrubber.

During the time interval required for the foam mass to move from the upper end of the soaking chamber 18, to the discharge outlet 42 at the lower end, a considerable volume of the foam begins to break up or collapse into liquid and free gas, and this reduces the overall volume of foam delivered to the foam breaker unit 14. The novel foam breaker utilizes a centrifugal force, gravity and mechanical impact to break up the foam bubbles into liquid and free gas. The foam breaker includes a first fan unit 62 having a scroll housing 64 with a tangential outlet boot 66 arranged to discharge the separated gas in a horizontal direction below the axis of rotation of a high-speed rotor 70 contained in the housing. The mass of foam enters the side of the scroll housing through an axial inlet via the outlet duct 42 from the lower end of the soaking chamber 18. The foam is fed into the housing along the horizontal axis of rotation of the rotor 70 and the high speed of the rotor blades centrifuges the foam outwardly against the peripheral wall of the scroll. The foam is impacted by the rotor blades and the foam bubbles are mechanically broken and collapsed. The centrifugal force acting on the denser liquid molecules causes the liquid to collect around the periphery of the scroll housing. This liquid moves toward the lower portion of the housing and is bled off via a tangential liquid outlet 68 which is just ahead of the gas outlet boot 66. This sludge containing liquid is directed into the settlement chamber 50 through a drain conduit 72. The liquid outlet 68 sort of bleeds off the liquid from the collapsed foam and the free gas then passes on through the outlet boot 66.

After the foam bubbles are collapsed by the centrifugal and impact action of the rotor 70, the cleansed gas released by collapse of the foam bubbles passes out into an inlet duct 74 which feeds into the sidewall of the scroll housing 76 of a second stage fan unit 80. The second stage fan unit 80 includes a tangential gas discharge outlet boot 78 and a tangential liquid discharge outlet 82 on the lower portion of the scroll housing for skimming or bleeding off the liquid from collapsed foam bubble. The second stage fan unit 80 also includes a high speed rotor 84 mounted in the scroll housing 76 for impacting the foam bubbles directly to collapse them and for collapsing the foam by centrifugal action against the peripheral wall of the scroll housing. Liquid skimmed or bled off from the second stage fan is directed into the settlement chamber 50 via a liquid line 86.

The second fan unit 80 of the foam breaker 14 is provided to break up and collapse any foam that is not broken up by the first or primary fan unit 62. Any foam not broken up in the first fan is discharged along with the free gas into the outlet boot 66 which is connected to the inlet duct 74 of the second fan unit. In addition, some foam may be present above the surface of the liquid in the settlement chamber 50 and the second fan unit is adapted to pull this foam up through a branch inlet duct 88 into the inlet duct 74 along with any foam present in the outlet of the first fan unit 62. By the time the gases reach the outlet boot 78 of the second fan unit 80, all of the foam has been collapsed and collected as liquid along with the impurities and absorbed gas in the settlement chamber 50. The foam breaker 14 is able to handle large flow rates or volumes of foam and efficiently collapse and break up the bubbles. The liquid and gas are effectively separated; the free gas is discharged with a relatively low relative humidity. The fan units 62 and 80 employ mechanical impact, centrifugal action and gravity to break up the foam mass and separate the liquid and gas at a minimum energy cost. The second fan unit handles any foam not broken up in the first fan 62 plus any foaming action that develops in the space above the liquid in the settlement chamber 50.

The centrifugal rotors of the fans 62 and 80 turn at high speed and are able to handle a relatively large volume flow rate of foam bubbles. The foam breaker 14 efficiently separates the foam into liquid and cleansed gas and the liquid is discharged into the liquid-holding settlement chamber 50 while the cleansed gas, freed by collapse of the foam bubbles, is passed out through the exhaust conduit 78. It should be noted that because a considerable volume of excess liquid is removed from the foam while soaking in the chamber 18, a reduction in volume flow rate of foam results and this reduces the volume of foam which must be handled by the foam breaker 14. This reduction in foam quantity lowers the amount of energy required per unit volume of gas handled and results in a highly economical foam scrubber operation.

The particle and impurity removal efficiency of the foam scrubber 10 has been found to be extremely high, especially in removal of gaseous impurities and the extremely small-size particulate impurities (for example, particles of one micron and less in average maximum dimension). It is believed that the production of foam bubbles with an average bubble size of 10 to 30 mils (.010 inch – .030 inch) provides a desirable, high ratio of liquid film surface area per unit volume of gas. The soaking time, while the foam is traveling through the chamber 18, is adjustable by control of the foam volume flow rate and chamber size to obtain high collection efficiency of even the smallest size contaminant particles which are believed to act in accordance with the Brownian theory inside the foam bubbles in the diffusion process. A period or soaking interval of 5 to 12 seconds is usually enough to provide excellent collection efficiencies with foam densities of around 1/2 pound per cubic foot.

It also has been found in tests conducted on a prototype foam scrubber 10 that a design maximum pressure drop of 12 inches of water can be used efficiently with average foam velocity through the system of approximately 150 feet per minute. Moreover, because it has been found that the pressure drop decreases as the water rates are increased, it is desirable to effect a compromise between these factors in order to minimize operating costs. The foam scrubber 10 is useful with hydrocarbon liquid foaming agents utilized, rather than water, in applications wherein the moisture content in the cleansed gases is critical. Suitable anhydrous foaming agents, such as Dow Corning Fluid "DC-2000," have been used with oil as a foam-producing scrubbing liquid, and this mixture has been found more effective for wetting and collecting some types of particulate matter and fumes than water or mixtures containing water. The scrubber 10 is well suited for using a variety of different foam-producing scrubbing liquids, including hydrocarbons, oils, and other chemical scrubbing agents in special industrial applications. For example, glycols and alcohols may be used as foaming agents, and these are effective in removing moisture from the gas being treated. Extremely good collection efficiencies have been achieved with a foam scrubber system 10 constructed in accordance with the invention. For example, efficiencies of 99.8 percent have been achieved in removing magnesium oxide particulate matter with particles of an average size of 3/10 to 5/10 of a micron and less. These efficiencies have been achieved with a total gas pressure drop in the system of 12 inches of water in comparison with venturi scrubbers which may require pressure drops in the order of 100 inches of water to achieve similar efficiencies. Moreover, in the foam scrubber 10, water rates of approximately 60 gallons of water per 1,000 cubic feet of gas flow have been used with success. An average foam velocity of 130 feet per minute, using grids 22 spaced approximately 1/4 inch apart has been effective and it has been found that an average total transit time for a foam bubble to travel through the system, from generation to collapse, in the order of 10 to 12 seconds, has been sufficient to provide for full diffusion of the contaminants in the gas into the liquid film of the bubbles with a high particle collection efficiency.

In accordance with another feature of the present invention, ammonia ($NH_3$) is introduced into the gases to be cleaned passing through the foam scrubber 10 and the ammonia reacts with the oxides of sulphur contained in the gas to form various compounds or combinations including ammonium sulphite [$(NH_4)_2 SO_3$]. This material is believed to be a major ingredient in the objectionable visible plumes heretofore formed at the exhaust stack outlets of prior art wet scrubbing systems when ammonia was used in the wet scrubbing process. It is believed that the plume comprises minute, submicronic, ammonium-sulphite particles having particles sized down to one-third of a micron of an inch and smaller in major dimension. This extremely particle small size is believed to contribute to the difficulty in removal of the particles from the gas even though the material itself is soluble in water.

It has been found that the foam scrubbing method and apparatus of the present invention is highly effective in removal of these plume forming particles at a much lower cost than heretofore possible in prior art scrubbers. For example, tests utilizing air at 70° F as the carrier gas with sulphur dioxide $SO_2$ and ammonia $NH_3$ introduced in equal amounts to a total of 500 PPM (parts per million) has required an operating pressure drop of 70 inches of water in a venturi type wet scrubber in order to remove the visible plume from the exhuast. The venturi scrubber utilized in the tests was constructed like the scrubber shown in U.S. copending patent application Ser. No. 91,854, filed Nov. 23, 1970 and the pressure drop was measured between the inlet opening 16 and the outlet opening 30.

The scrubbing apparatus 10 of the present invention was tested with identical test gas comprising air at 70° F with ammonia gas ($NH_3$) injected therein at the ratio of 250 PPM and sulphur dioxide gas ($SO_2$) at the ratio of 250 PPM. The foam scrubber was operated at a pressure drop of 14 inches of water measured between the inlet duct 24 and the foam outlet duct 78 leading to the foam breaker or separator 14. Using a mixture of water and liquid foaming agent comprising "Triton X-100" liquid detergent no visible plume was present at the exhaust stack. Objectionable constituents such as sulphur dioxide ($SO_2$) can be effectively removed from industrial gas in the foam scrubber 10 of the present invention at a fraction of the cost required in prior art wet scrubbers. The power required for running the foam scrubber 10 of the present invention at a pressure drop of 14 inches of water is substantially lower per cubic foot of gas treated than heretofore possible with venturi type wet scrubbers which require much higher pressure drops in the range of 70 inches of water to approximate the same result.

In addition to the tests described many other tests have been run on the foam scrubber 10 of the present invention utilizing a test gas having electric arc furnace dust introduced therein in precisely controlled amounts. Particle size distribution on the electric arc furnace dust show that more than 50 percent of the particles are sized below 1/2 micron of an inch and 70 percent of the particles are below 1 micron in size. In preparing the dust for testing, the dust is collected in a filter from the exhaust stack of an electric furnace and is then thoroughly dried to drive off all moisture. The dried dust is passed through a high speed hammer mill (10,000 RPM) having an outlet screen with openings of .025 inches therein. The test dust is introduced into the gas flowing into the foam scrubber inlet duct 22 in controlled amounts per unit time. Exhaust gas from the stack 86 is carefully sampled in accordance with the test procedure outlined and specified by a bulletin published by the Industrial Gas Cleaning Institute entitled "Test Procedures for Gas Scrubbers, Wet Collection Division." The procedures are also outlined in "Report No. 177, Instructions for Sampling Particulates," by Frank Ekman, copyrighted 1968, National Dust Collector Corp. and revised in September, 1971. In these specified test procedures, dust sampling is accomplished using glass fibre filter paper, Gelman Type E which is rated to have a particle removal efficiency of 99.7 percent for dioctyl phlhalate droplets down to .3 microns in size. For all practical purposes this type of filter is close to absolute filter for particulates.

In tests run on the foam scrubber 10 using the electric arc furnace test dust in varying amounts, removal efficiencies of greater than 99.9 percent were achieved. In 30 min. test runs, only a slight discoloration of the outlet sample paper was present and no particulate matter was discernible with a light microscope. Operating pressures during the runs were varied from 14 to 27 inches of water with no discernible change in the efficiency of collection. Tests with the same test dust and dust loading per cubic foot of gas in prior art venturi scrubbers have required operating pressures of 65 inches of water or better to achieve similar collection efficiencies.

Other tests with the foam scrubber 10 indicate excellent characteristics for absorbtion processes wherein noxious impurities in gaseous form are removed from the stack gas being scrubbed. Nitric oxide is a difficult gas to remove from common stock gases, and other oxides of nitrogen are also difficult to remove. Generally, oxides of nitrogen even in relatively low concentrations are potential health hazards and many attempts have been made to remove these gases on an economical cost basis.

In tests run with the foam scrubber 10, concentrations of nitric oxide of approximately 1,000 PPM were introduced in the scrubber and removal efficiencies of 32 to 38 percent were achieved while operating in the pressure drop range of 14 to 27 inches of water. Both inlet and outlet samples were taken and the test for nitric oxide was the Phenoldisulphonic Acid Method. The test results compare very favorably to efficiencies of 15 to 18 percent nitric oxide removal in conventional nitric oxide absorber towers operated at the same range in pressure drop.

The new and improved foam scrubber apparatus 10 for wet scrubbing industrial gases in accordance with the present invention employs a mass of liquid foam bubbles of small size for soaking the gas within the foam bubbles for a selected time or soak period. The scrubber is extremely effective and efficient in the removal of many "hard to collect" gas contaminants and pollutants. The present invention provides a new and improved apparatus which is economical to operate and lower in cost than heretofore thought possible.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A foam scrubber for cleaning industrial gases and the like comprising foam generating means including a chamber having an inlet for gas and an outlet for foam, a plurality of grid layers in said chamber spaced in succession between said inlet and outlet and extending generally transverse to the gas flow between said inlet and outlet for dividing and redividing the flow into a plurality of separate streams, means for wetting a first of said grid layers with liquid foaming agent to generate a mass of moving liquid film, foam bubbles enveloping small discrete volumes of said gas therein as said gas moves between said inlet and outlet, each of said grid layers comprising a honeycomb-like structure formed of a plurality of thin elongated strips interconnected to form a plurality of separate flow passages, said strips having thin knife-like edges facing into the direction of gas flow for dividing the same into separate streams and having a width parallel of the direction of gas flow through said passages substantially greater than the thickness of said thin knife edge for wetting the gas moving through said passages with said liquid foaming agent to form said foam bubbles.

2. The foam scrubber of claim 1 wherein said honeycomb-like structures include spaced apart strips interconnected with transverse strips, all of said strips having their thin knife edges facing into the gas flowing from said inlet for dividing the flow into plurality streams.

3. The foam scrubber of claim 1 including wherein said thin strips have a width parallel of the direction of gas flow substantially greater than said thin knife edge thickness for wetting the gas passing through said grid means with said liquid foaming agent.

4. The foam scrubber of claim 2 wherein said transverse strips comprise elongaged zig-zag shaped members connected with facing surfaces of said spaced apart strips.

5. The foam scrubber of claim 4 wherein said spaced apart strips are curved and spaced outwardly of a common axis extended parallel of the direction of gas flow in said chamber.

6. The foam scrubber of claim 5 wherein said spaced apart strips comprise a plurality of concentric cylinders having successively greater radii, said zig-zag strip interconnected between each adjacent pair of concentric cylinder strips.

7. The foam scrubber of claim 2 including a plurality of said transverse grid layers spaced apart in parallel mounted downstream of said inlet of said chamber, said discrete passages of successive layers downstream staggered with respect to those upstream for successive division of said plural gas streams downstream of said inlet.

8. The foam scrubber of claim 1 wherein said strips comprise ribbons of metal having an edge thickness of approximately .001 inch to .005 inch and a width of approximately .10 inch to .25 inch.

9. The foam scrubber of claim 5 wherein said curved spaced apart strips comprise expanding spirals around said axis and said zig-zag member is secured to space said spiral strips apart.

10. The foam scrubber of claim 9 wherein said zig-zag member is welded to said spiral strips alternately.

* * * * *

UNITED STATES PATENT OFFICE
CERTIFICATE OF CORRECTION

Patent No. 3,811,247            Dated May 21, 1974

Inventor(s) Huppke

It is certified that error appears in the above-identified patent and that said Letters Patent are hereby corrected as shown below:

-- Assignee: Environeering Inc., Skokie, Illinois --

Delete the following entry:

"Related U.S. Application Data
[63] Continuation-in-part of Ser. No. 190,893 Oct. 20, 1971."

Column 1, line 5, delete "this" and insert -- which --

Signed and sealed this 1st day of October 1974.

(SEAL)
Attest:

McCOY M. GIBSON JR.
Attesting Officer

C. MARSHALL DANN
Commissioner of Patents